United States Patent
Xiaoqi et al.

(10) Patent No.: US 10,271,112 B2
(45) Date of Patent: Apr. 23, 2019

(54) SYSTEM AND METHOD FOR DYNAMIC ADAPTIVE VIDEO STREAMING USING MODEL PREDICTIVE CONTROL

(71) Applicant: Carnegie Mellon University, Pittsburgh, PA (US)

(72) Inventors: Yin Xiaoqi, Pittsburgh, PA (US); Sekar Vyas, Pittsburgh, PA (US); Sinopoli Bruno, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 94 days.

(21) Appl. No.: 15/082,444

(22) Filed: Mar. 28, 2016

(65) Prior Publication Data

US 2017/0026713 A1  Jan. 26, 2017

Related U.S. Application Data

(60) Provisional application No. 62/177,904, filed on Mar. 26, 2015.

(51) Int. Cl.
| | |
|---|---|
| *H04N 21/61* | (2011.01) |
| *H04N 21/643* | (2011.01) |
| *H04N 21/647* | (2011.01) |
| *H04N 21/845* | (2011.01) |
| *H04N 21/2343* | (2011.01) |
| *H04N 21/44* | (2011.01) |
| *H04N 21/442* | (2011.01) |
| *H04N 21/658* | (2011.01) |
| *H04N 21/6587* | (2011.01) |

(52) U.S. Cl.
CPC ... *H04N 21/8456* (2013.01); *H04N 21/23439* (2013.01); *H04N 21/44004* (2013.01); *H04N 21/44209* (2013.01); *H04N 21/6125* (2013.01); *H04N 21/643* (2013.01); *H04N 21/6581* (2013.01); *H04N 21/6587* (2013.01)

(58) Field of Classification Search
None
See application file for complete search history.

(56) References Cited

U.S. PATENT DOCUMENTS

| | | | | |
|---|---|---|---|---|
| 8,239,564 | B2* | 8/2012 | Freelander | H04L 67/1008 709/217 |
| 8,578,436 | B2* | 11/2013 | Li | H04L 47/38 370/235 |
| 8,644,154 | B2* | 2/2014 | Vivanco | H04L 47/10 342/357.4 |
| 8,978,056 | B2* | 3/2015 | Albal | H04N 21/4331 725/14 |
| 9,313,529 | B2* | 4/2016 | Nilsson | H04N 21/23424 |
| 9,323,862 | B2* | 4/2016 | Fiatal | G06F 17/30106 |
| 9,544,623 | B2* | 1/2017 | Chen | H04N 21/25866 |
| 9,769,284 | B2* | 9/2017 | Gibbon | H04L 67/325 |
| 9,955,190 | B2* | 4/2018 | Reibman | H04N 21/2402 |

(Continued)

*Primary Examiner* — Jonathan V Lewis

(57) ABSTRACT

A client video player device downloads video content from a video content delivery network as segments encoded at respective bitrates selected from distinct encoding bitrates. Bitrate adaptation logic within the client video player selects the appropriate bitrate segment in order to maximize user-perceived Quality-of-Experience. An optimization of this bitrate adaptation logic implementing model predictive control that maximizes the user-perceived Quality-of-Experience is presented.

15 Claims, 4 Drawing Sheets

(56) References Cited

U.S. PATENT DOCUMENTS

| | | | |
|---|---|---|---|
| 10,063,656 B2* | 8/2018 | Gibbon | H04W 4/029 |
| 2003/0115294 A1* | 6/2003 | Hoang | H04N 7/163 |
| | | | 709/219 |
| 2005/0015259 A1* | 1/2005 | Thumpudi | G10L 19/24 |
| | | | 704/500 |
| 2008/0075164 A1* | 3/2008 | Matsumura | H04N 19/172 |
| | | | 375/240.12 |
| 2008/0191816 A1* | 8/2008 | Balachandran | H04L 47/10 |
| | | | 333/24 R |
| 2010/0020970 A1* | 1/2010 | Liu | G06K 7/1093 |
| | | | 380/255 |
| 2010/0189183 A1* | 7/2010 | Gu | H04N 21/23439 |
| | | | 375/240.28 |
| 2010/0246677 A1* | 9/2010 | Nilsson | H04N 7/50 |
| | | | 375/240.14 |
| 2010/0316126 A1* | 12/2010 | Chen | H04N 19/124 |
| | | | 375/240.16 |
| 2013/0013803 A1* | 1/2013 | Bichot | H04L 65/1046 |
| | | | 709/231 |
| 2013/0042015 A1* | 2/2013 | Begen | H04N 19/46 |
| | | | 709/231 |
| 2013/0268577 A1* | 10/2013 | Oyman | H04N 13/00 |
| | | | 709/203 |
| 2013/0286868 A1* | 10/2013 | Oyman | H04W 24/06 |
| | | | 370/252 |
| 2013/0290493 A1* | 10/2013 | Oyman | H04L 65/608 |
| | | | 709/219 |
| 2013/0314553 A1* | 11/2013 | Sun | H04N 17/004 |
| | | | 348/192 |
| 2013/0326024 A1* | 12/2013 | Chen | H04L 65/4084 |
| | | | 709/219 |
| 2013/0343222 A1* | 12/2013 | Chen | H04L 41/5038 |
| | | | 370/252 |
| 2014/0040496 A1* | 2/2014 | Moorthy | H04L 65/4084 |
| | | | 709/231 |
| 2014/0139687 A1* | 5/2014 | Adams | H04N 17/004 |
| | | | 348/192 |
| 2014/0219230 A1* | 8/2014 | Schierl | H04W 72/08 |
| | | | 370/329 |
| 2014/0282792 A1* | 9/2014 | Bao | H04N 21/44004 |
| | | | 725/116 |
| 2014/0294099 A1* | 10/2014 | Brydon | H04N 19/196 |
| | | | 375/240.26 |
| 2014/0301236 A1* | 10/2014 | Martin-Carnerero | H04L 43/062 |
| | | | 370/252 |
| 2014/0366069 A1* | 12/2014 | Ramamurthi | H04W 36/22 |
| | | | 725/62 |
| 2015/0035996 A1* | 2/2015 | Gao | H04N 17/004 |
| | | | 348/192 |
| 2015/0085875 A1* | 3/2015 | Phillips | H04L 65/601 |
| | | | 370/465 |
| 2015/0106312 A1* | 4/2015 | Chen | H04W 4/028 |
| | | | 706/21 |
| 2015/0180740 A1* | 6/2015 | Yoshida | H04L 47/823 |
| | | | 370/252 |
| 2015/0256581 A1* | 9/2015 | Kolhi | H04L 65/602 |
| | | | 709/219 |
| 2015/0281303 A1* | 10/2015 | Yousef | H04N 21/643 |
| | | | 709/219 |
| 2015/0326901 A1* | 11/2015 | Tiraspolsky | H04N 21/2625 |
| | | | 725/31 |
| 2015/0350276 A1* | 12/2015 | Karlsson | H04L 65/60 |
| | | | 709/231 |
| 2015/0373075 A1* | 12/2015 | Perlman | H04L 65/608 |
| | | | 709/217 |
| 2016/0072864 A1* | 3/2016 | Houdaille | H04L 43/0894 |
| | | | 709/231 |
| 2016/0073106 A1* | 3/2016 | Su | H04N 21/234363 |
| | | | 375/240.02 |
| 2016/0381113 A1* | 12/2016 | Phillips | H04L 65/601 |
| | | | 709/219 |

* cited by examiner

Algorithm 1 Video adaptation workflow using MPC

1: Initialize
2: for k + 1 to K do
3:    if player is in startup phase then
4:       $\hat{C}_{[t_k, t_{k+N}]}$ = ThroughputPred($C_{[t_1, t_k]}$)
5:       $[R_k, T_s] = f_{mpc}^{st}(R_{k-1}, B_k, \hat{C}_{[t_k, t_{k+N}]})$
6:       Start playback after $T_s$ seconds
7:    else if playback has started then
8:       $\hat{C}_{[t_k, t_{k+N}]}$ = ThroughputPred($C_{[t_1, t_k]}$)
9:       $R_k = f_{mpc}(R_{k-1}, B_k, \hat{C}_{[t_k, t_{k+N}]})$
10:   end if
11:   Download chunk k with bitrate $R_k$, wait til finished
12: end for

FIG. 2

SYSTEM AND METHOD FOR DYNAMIC ADAPTIVE VIDEO STREAMING USING MODEL PREDICTIVE CONTROL

RELATED APPLICATIONS

This application claims the benefit of U.S. Provisional Patent Application Ser. No. 62/177,904, filed Mar. 26, 2015.

GOVERNMENT INTEREST

This invention was made with government support under National Science Foundation No. ECCS0925964. The government has certain rights in this invention.

FIELD OF THE INVENTION

This invention relates to streaming of video content over the Internet, specifically relating to optimizations of client-side adaptive bitrate streaming players to maximize user quality-of-experience (QoE).

BACKGROUND OF THE INVENTION

With more and more content providers delivering video stream services over the Internet, user-perceived quality-of-experience has become an important differentiator. The quality-of-experience metric includes duration of rebuffering, startup delay, average playback bitrate, and the stability of that bitrate. There is little to no support in the network for optimizing or controlling these characteristics, forcing the client player unit to cope with the intermittent congestion, diverse bottlenecks, and other complexities of the Internet.

Modern client video players use bitrate adaptation logic in order to achieve a high quality-of-experience. Many proprietary implementations of video players have been fielded, but the first adaptive bit-rate HTTP-based streaming solution that is an international standard is Dynamic Adaptive Streaming over HTTP (DASH), also known as MPEG-DASH. The logic that performs the MPEG-DASH bit-rate adaptation within the video player unit, while currently superior to non-bit-rate adaptive players, has not been thoroughly optimized for quality-of-experience.

SUMMARY OF THE INVENTION

MPEG-DASH works by breaking the video content into a sequence of small HTTP-based file segments, each segment containing a short interval of playback time of a content that is potentially many hours in duration, such as a movie or the live broadcast of a sports event. The content is made available at a variety of different bit rates. In other words, alternative segments encoded at different bit rates covering aligned short intervals of playback time are made available. In order to seamlessly adapt to changing network conditions and provide high quality play back with fewer stalls or re-buffering events, the MPEG-DASH client selects the next segment to download and play back from the different bit rate alternatives based on either current network conditions or current playback buffer occupancy.

This invention offers an alternative method to choose the next segment from the different bit rate alternatives via model predictive control (MPC), a systematic combination of buffer occupancy and bandwidth predictions. This novel technique creates a video playback system whose performance is near optimal.

BRIEF DESCRIPTION OF THE DRAWINGS

FIG. 2 shows an exemplary graph of buffer occupancy as a function of time (i.e., buffer dynamics).

DETAILED DESCRIPTION OF THE INVENTION

Figure 1:
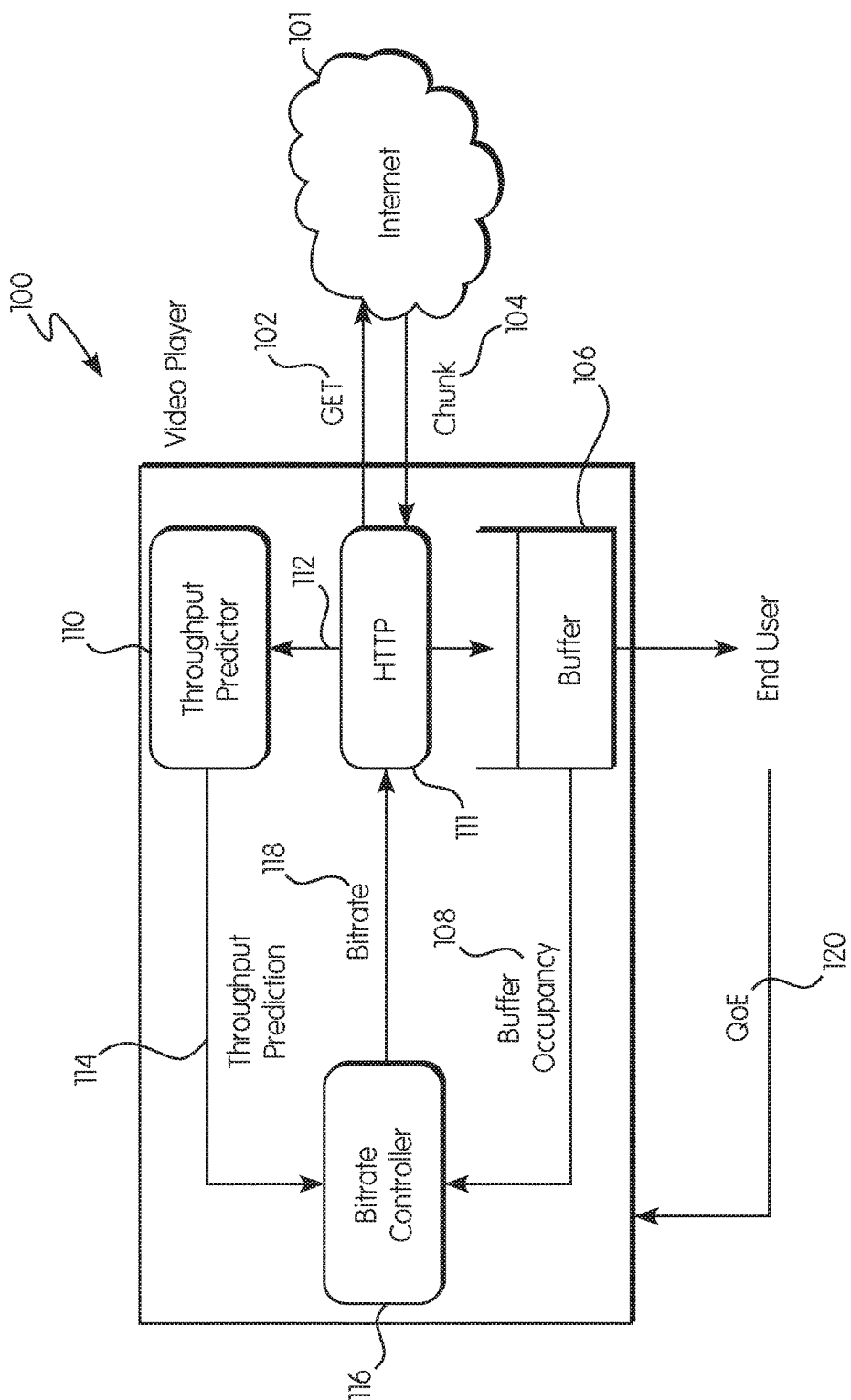
FIG. 1 shows a block diagram of the adaptive video player of the present invention.

For purposes herein, a "video player" shall be defined as any device capable of streaming video from a network connection, including, for example, via WiFi, BlueTooth, a cellular data connection such as LTE, a hardwired connection or via any means of connecting to a server capable of serving video at mixed bitrates. Such devices include, but are not limited to smart televisions, projectors, video streaming devices (AppleTV, ChromeCast®, Amazon Fire Stick, Roku™, etc.), video gaming systems, smart phones, tablets and software-based video players running on generic computing devices.

For a user to perceive the client-side video player, many components are required, including a video display screen, a video display subsystem with buffering, a networking interface, a processor of some sort in order to perform the networking functions and HTTP processing, and logic to perform the bitrate adaptation method described in detail following (implemented in either an integrated circuit module and or in software on a general purpose processor). A component model of the adaptive video player is illustrated in FIG. 1.

Video player 100 makes 14 requests 102, via HTTP module 111, to an internet-based video server 101, requesting video segments 104 at a specific bitrate R. As video segments 104 are received by HTTP module 111, they are placed in playback buffer 106. Buffer occupancy is determined by the difference between the rate at which video segments 104 are downloaded into playback buffer 106 and the rate at which video segments 104 are removed from playback buffer 106 for rendering on a video display screen.

Video can be modeled as a set of consecutive video segments or chunks, $V=\{1, 2, \ldots, K\}$, 104, each of which contains L seconds of video and encoded with different bitrates. Thus, the total length of the video is K×L seconds. The video player can choose to download video segment k with bitrate $R_k \in R$, where R is the set of all available bitrate levels. The amount of data in segment k is then $L \times R_k$. The higher bitrate is selected, the higher video quality is perceived by the user. Let $q(\cdot):R \to R+$ be the function which maps selected bitrate $R_k$ to video quality perceived by user $q(R_k)$. The assumption is that $q(\cdot)$ is increasing.

The video segments are downloaded into a playback buffer, 106 as shown in FIG. 1, which contains downloaded but as yet unviewed video. Let $B(t) \in [0, B_{max}]$ be the buffer occupancy 108 at time t, i.e., the play time of the video remained in the buffer. The buffer size $B_{max}$ depends on the policy of the service provider, as well as storage limitations.

FIG. 2 helps illustrate the operation of the video player. At time $t_k$, the video player starts to download segment k. The downloading time depends on the selected bitrate $R_k$ as well as average download speed $C_k$. At time $t_{k+1}$, when segment k is completely downloaded, the video player immediately starts to download the next segment k+1. If $C_t$ denotes the bandwidth at time t, then:

$$t_{k+1} = t_k + \frac{d_k(R_k)}{C_k} + \Delta t_k \quad (1)$$

$$C_k = \frac{1}{t_{k+1} - t_k - \Delta t_k} \int_{t_k}^{t_{k+1} - \Delta t_k} C_t \, dt. \quad (2)$$

The buffer occupancy B(t) evolves as the chunks are being downloaded and the video is being played. Specifically, the buffer occupancy increases by L seconds after chunk k is downloaded and decreases as the user watches the video. Let $B_k = B(t_k)$ denote the buffer occupancy when the player starts to download chunk k. The buffer dynamics can then be formulated as:

$$B_{k+1} = \left(\left(B_k - \frac{d_k(R_k)}{C_k}\right)_+ + L - \Delta t_k\right)_+ \quad (3)$$

Figure 3:
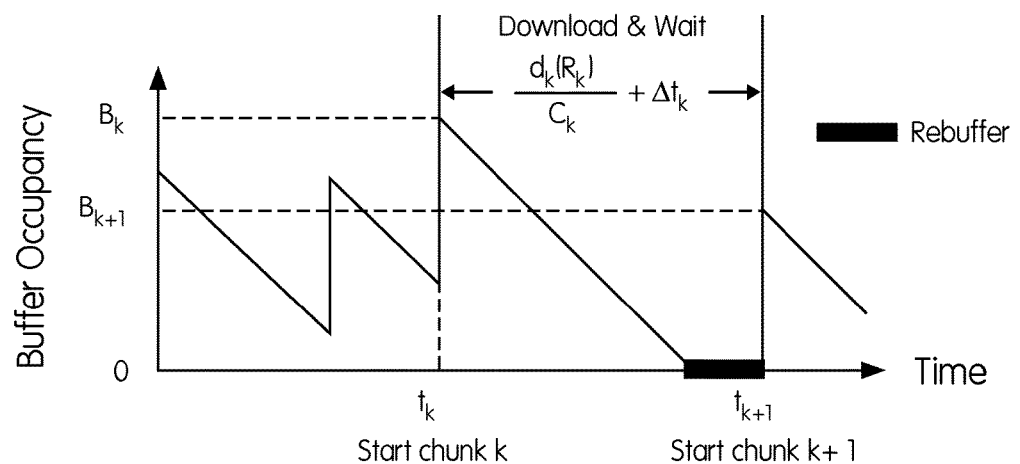
FIG. 3 shows the basic algorithm of used by a video player of the present invention.

An example of buffer dynamics is shown in FIG. 3.

The determination of waiting time $\Delta t_k$, also referred as chunk scheduling problem, is an equally interesting and important problem in improving fairness of multi-player video streaming. It is assumed that the player immediately starts to download chunk k+1 as soon as chunk k is downloaded. The one exception is when the buffer is full, at which time the player waits for the buffer to reduce to a level which allows chunk k to be appended. Formally, $$\Delta t_k = \left(\left(B_k - \frac{d_k(R_k)}{C_k}\right)_+ + L - B_{max}\right)_+ \quad (4)$$

The ultimate goal of bitrate adaptation is to improve the QoE of users to achieve higher long-term user engagement. A flexible QoE model, as opposed to a fixed notion of QoE is therefore used. While users may differ in their specific QoE functions, the key elements of video QoE are enumerated as:

Average Video Quality—The average per-chunk quality over all chunks:

$$\frac{1}{K}\sum_{k=1}^{K} q(R_k)$$

Average Quality Variations—This tracks the magnitude of the changes in the quality from one chunk to another:

$$\frac{1}{K}\sum_{k=1}^{K-1} |q(R_{k+1}) - q(R_k)|$$

Total rebuffer Time—For each chunk k rebuffering occurs if the download time $d_k(R_k)/C_k$ is higher than the playback buffer level when the chunk download started (i.e., $B_k$). Thus the total rebuffer time is:

$$\sum_{k=1}^{K} \left(\frac{d_k(R_k)}{C_k} - B_k\right)_+$$

Alternatively, the number of rebufferings could be used in lieu of total rebuffer time:

$$\sum_{k=1}^{K} \mathbb{1}\left(\frac{d_k(R_k)}{C_k} > B_k\right)$$

Lastly, Startup Delay $T_s$, assuming $T_s \ll B_{max}$.

As users may have different preferences on which of four components is more important to them, the QoE of video segment 1 through K is defined by a weighted sum of the aforementioned components:

$$QoE_1^K = \quad (5)$$

$$\sum_{k=1}^{K} q(R_k) - \lambda \sum_{k=1}^{K-1} |q(R_{k+1}) - q(R_k)| - \mu \sum_{k=1}^{K} \left(\frac{d_k(R_k)}{C_k} - B_k\right)_+ - \mu_s T_s$$

Here, $\lambda$, $\mu$ and $\mu_s$ are non-negative weighing parameters corresponding to video quality variations and rebuffering time, respectively. A relatively small $\lambda$ indicates that the user is not particularly concerned about video quality variability; the larger $\lambda$ is, the more effort is made to achieve smoother changes of bitrates. A large $\mu$, relative to the other parameters, indicates that a user is deeply concerned about rebuffering. In cases where users prefer low startup delay, a large $\mu_s$ is employed.

This definition of QoE is very general and allows customization so it can easily take into account user's preference, and could be extended as needed to incorporate other factors. As can be seen if FIG. 1, the QoE preferences 120 of the user is one of the factors used by bitrate controller 116 to determine the bitrate 118 of subsequent requests 102 for video chunks.

The problem of bitrate adaptation for QoE maximization can therefore be formulated in the following way:

$$\max_{R_1,\ldots,R_K,T_s} QoE_1^K \quad (6)$$

$$\text{s.t.} \quad t_{k+1} = t_k + \frac{d_k(R_k)}{C_k} + \Delta t_k, \quad (7)$$

$$C_k = \frac{1}{t_{k+1} - t_k - \Delta t_k} \int_{t_k}^{t_{k+1} - \Delta t_k} C_t \, dt, \quad (8)$$

$$B_{k+1} = \left(\left(B_k - \frac{d_k(R_k)}{C_k}\right)_+ + L - \Delta t_k\right)_+, \quad (9)$$

$$B_1 = T_s, \, B_k \in [0, B_{max}] \quad (10)$$

$$R_k \in \mathcal{R}, \, \forall \, k = 1, \ldots, K. \quad (11)$$

This can be denoted as $QoE\_MAX_1^K$.

The bandwidth trace $C_t$, $t \in [t_1, t_{K+1}]$ serves as input to the problem. The outputs of $QoE\_MAX_1^K$ are bitrate decisions bitrate decisions $R_1, \ldots, R_K$, and startup time $T_S$.

Note that the problem $QoE\_MAX_1^K$ is formulated assuming the video playback has not started at the time of this optimization so the start-up delay $T_S$ is a decision variable. However, this QoE maximization can also take place during video playback at time $t_{k_0}$ when the next chunk to download is $k_0$ and the current buffer occupancy is $B_{k_0}$. In this case, the variable $T_s$ can be dropped and the corresponding steady state problem denoted as QOE_MAX_STEADY$^K_{k_0}$.

A source of randomness is the bandwidth $C_t$: At time $t_k$ when the video player chooses bitrate $R_k$, only the past bandwidth $\{C_t, t \leq tk\}$ is available while the future values $\{C_t, t > t_k\}$ are not known. However a throughput predictor 110 can be used to obtain predictions for future available bandwidth 114 based on past throughput 112, defined as $\{\hat{C}_t, t > t_k\}$. Based on such predictions 114, and on buffer occupancy information 108 (which is instead known precisely) and the QoE preferences 120 of the user, the bitrate controller 116 selects bitrate 118 of the next segment k:

$$R_k = f(B_k, \{\hat{C}_t, t > t_k\}, \{R_i, i < k\}). \quad (12)$$

Note that the basic MPC algorithms assume the existence of an accurate throughput predictor. However, in certain severe network conditions, e.g., in cellular networks or in prime time when the Internet is congested, such accurate predictors may not be available. For example, if the predictor consistently overestimates the throughput, it may induce high rebuffering. To counteract the prediction error, a robust MPC algorithm is presented. Robust MPC optimizes the worst-case QoE assuming that the actual throughput can take any value in a range $[\hat{C}_t, \check{C}_t]$ in contrast to a point estimate $\hat{C}_t$. Robust MPC entails solving the following optimization problem at time $t_k$ to get bitrate $R_k$:

$$R_k = f_{robustmpc}\left(R_{k-1}, B_k, \left[\hat{C}_t, \overline{\hat{C}}_t\right]\right): \max_{R_k,\ldots,R_{k+N}} \min_{C_t \in \left[\hat{C}_t, \overline{\hat{C}}_t\right]} QoE_k^{k+N-1}$$

subject to the constraints in paragraph [0028].

In general, it may be non-trivial to solve such a max-min robust optimization problem. In this case, however, the worst case scenario takes place when the throughput is at its lower bound $Ct=\hat{C}t$. Thus, the implementation of robust MPC is straightforward. Instead of $\hat{C}t$, the lowest possible $\hat{C}t$ is used as the input to the MPC QoE maximization problem.

To verify the inventions improved QoE over current methods, a normalized QoE metric was defined to compare performance of available video playback systems. These systems, along with the invention, were compared to the optimal possible performance, that which could be achieved if the future bandwidth of the network was known.

For a given bandwidth trace $\{C, t \in [t, t_{K+1}]\}$, the offline optimal QoE, denoted by QoE(OPT), is the maximum QoE that can be achieved with perfect knowledge of future bandwidth over the entire time horizon.

Technically, it is calculated by solving problem QoE_MAX$_1^K$. While the assumption of knowing the entire future is not true in reality, the offline solution provides a theoretical upper bound for all systems for a particular bandwidth trace.

On the other hand, online QoE with bitrate selection system A is calculated under the assumption that at time $t_k$, the bitrate controller only knows the past bandwidth $\{Ct, t \in [t_1, t_k]\}$. Based on this, $R_k$ (i.e., the bitrate 118 for the next video segment) is selected. The online QoE achieved by algorithm A can be denoted by QoE(A).

Because offline optimal solution assumes perfect knowledge about the future, for any video playback system the online QoE is always less than the offline optimal QoE. In other words, QoE(OPT) is an upper bound of online QoE achieved by any video playback system. To this end, QoE of A (n-QoE(A)) is defined as the performance metric for an system A:

$$n\text{-}QoE(A) = \frac{QoE(A)}{QoE(OPT)}$$

FIG. 2 shows a high-level overview of the workflow of the MPC algorithm for bitrate adaptation. The algorithm essentially chooses bitrate $R_k$ by looking N steps ahead (i.e., the moving horizon), and solves a specific QoE maximization problem (this depends on whether the player is in steady or startup phase) with throughput predictions $\{\hat{C}_t, t \in [t_k, t_{k+N}]\}$, or $\hat{C}_{[t_k, t_{k+N}]}$. The first bitrate $R_k$ is applied by using feedback information and the optimization process is iterated at each step k.

At iteration k, the player maintains a moving horizon from chunk k to k+N−1 and carries out the following three key steps, as shown in Algorithm 1.

1. Predict: Predict throughput $\hat{C}_{[t_k, t_{k+N}]}$ for the next N chunks using some throughput predictor. The actual prediction mechanism relies on existing approaches. Improving the accuracy of this prediction will improve the gains achieved via MPC. That said, MPC can be extended to be robust to errors as we discuss below.

2. Optimize: This is the core of the MPC algorithm: Given the current buffer occupancy $B_k$, previous bitrate $R_{k-1}$ and throughput prediction $\hat{C}_{[t_k, t_{k+N}]}$, find optimal bitrate $R_k$. In steadystate, $R_k = f_{mpc} R_{k-1}, B_k, \hat{C}_{[t_k, t_{k+N}]}$, implemented by solving QOE_MAX_STEADY$_k^{k+N-1}$ In the start-up phase, it also optimizes start-up time $T_S$ as:

$$[R_k, T_s] = f_{mpc}^{st}(R_{k-1}, B_k, \hat{C}_{[t_k, t_{k+N}]})$$

implemented by solving

QOE_MAX$_k^{k+N-1}$

If practical details about computational overhead, are ignored, off-the-shelf solvers such as CPLEX can be used to solve these discrete optimization problems.

3. Apply: Start to download chunk k with $R_k$ and move the horizon forward. If the player is in start-up phase, wait for $T_s$ before starting playback.

This workflow has several qualitative advantages compared with buffer-based (BB), rate-based (RB). First, the MPC algorithm uses both throughput prediction and buffer information in a principled way. Second, compared to pure RB approaches, MPC smooths out prediction error at each step and is more robust to prediction errors. Specifically, by optimizing several chunks over a moving horizon, large prediction errors for one particular chunk will have lower impact on the performance. Third, MPC directly optimizes a formally defined QoE objective, while in RB and BB the tradeoff between different QoE factors is not clearly defined and therefore can only be addressed in an ad hoc qualitative manner.

Experimentation using this invention over a wide variety of network conditions have shown a higher normalized QoE compared to existing video playback systems.

Lastly, as opposed to rate-based and buffer-based algorithms, which need relatively minor computations, the challenge with MPC is that a discrete optimization problem needs to be solved at each time step. There are two practical concerns here.

(1) Computational overhead: The high computational overhead of MPC is especially problematic for low-end mobile devices, which are projected to be the dominant video consumers going forward. Since the bitrate adaptation decision logic is called before the player starts to download each chunk, excessive delay in the bitrate adaptation logic will negatively affect the QoE of the player.

(2) Deployment: Because there is no closed-form or combinatorial solution for the QoE maximization problem, a solver (e.g., CPLEX or Gurobi) will need to be used. However, it may not be possible for video players to be bundled with such solver capabilities; e.g., licensing issues may preclude distributing such software or it may require additional plugin or software installations which poses significant barriers to adoption.

Therefore, it is evident that the solution should be lightweight and combinatorial (i.e., not solving a LP or ILP online). As such, also presented herein is a fast and low-overhead FastMPC design that does not require any explicit solver capabilities in the video player.

At a high level, FastMPC algorithms essentially follow a table enumeration approach. Here, an offline step of enumerating the state-space and solving each specific instance is performed. Then, in the online step, these stored optimal control decisions mapped to the current operation conditions are used. That is, the algorithm will be reduced to a simple table lookup indexed by the key value closest to the current state and the output of the lookup is the optimal solution for the selected configuration.

Figure 4:
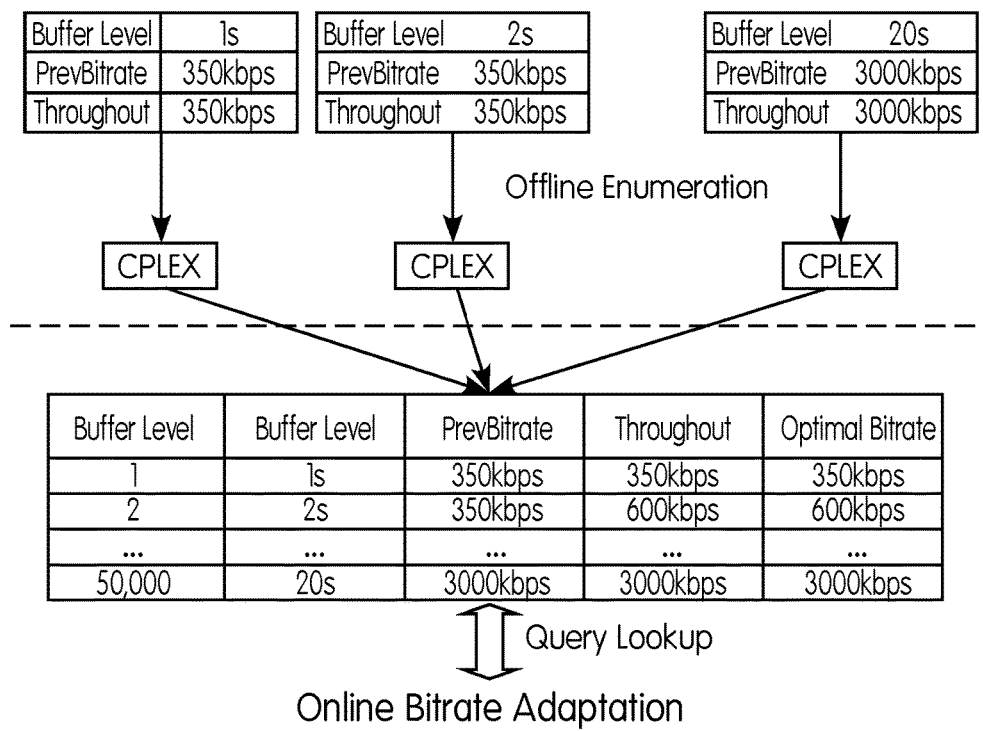
FIG. 4 shows a table showing the enumeration of possible scenarios in the FastMPC version of the present invention.

As shown in FIG. 4, the state-space is determined by the following dimensions: (1) current buffer level, (2) previous bitrates chosen, and (3) the predicted throughput for the next N chunks (i.e., the planning horizon). Thus, FastMPC will entail enumerating potential scenarios capturing different values for each dimension and solving the optimization problems offline.

Unfortunately, directly using this idea will be very inefficient because of the high dimensional state space. For instance, if there are 100 possible values for the buffer level, 10 possible bitrates, a horizon of size 5, and 1000 possible throughput values, there will be $10^{18}$ rows in the table. There are two obvious consequences of this large state space. First, it may not be practical to explicitly store the full table in the memory, causing any implementation to have a very high memory footprint along with a large startup delay, as the table will need to be downloaded to the player module. Second, it will incur a non-trivial offline computation cost that may need to be rerun as the operating conditions change.

There are two key optimizations that will make FastMPC practical.

Compaction via binning: To address the offline exploration cost, it should be realized that very fine-grained values for the buffer and the throughput levels may not be needed. As a consequence, these values may be suitably coarsened into aggregate bins. Moreover, with binning, row keys do not need to be explicitly stored the as these are directly computed from the bin row indices. The challenge is to balance the granularity of binning and the loss of optimality in practice. In practice, using approximately 100 bins for buffer level and 100 bins for throughput predictions works well and yields near-optimal performance.

Table compression: The decision table learned by the offline computation has significant structure. Specifically, the optimal solutions for several similar scenarios will likely be the same. Thus, this can be exploited this structure in conjunction with the binning strategy to explore a simple lossless compression strategy using a run-length encoding to store the decision vector. The optimal decision can then be retrieved online using binary search. In practice, with compression, the table occupies less than 60 kB with 100 bins for buffer levels, 100 bins for throughput predictions and 5 bitrate levels.

The invention may be implemented in any video player 100, as defined herein, as, for example, a built-in feature, an add-on, a downloadable app, a piece of software, etc., or in any other way of implementation, currently known or yet to be developed.

Although the invention is illustrated and described herein with reference to specific embodiments, the invention is not intended to be limiting to the details shown. Rather, various modifications may be made in the details without departing from the invention.

We claim:

1. A streaming video playback device comprising:
   a video display;
   a video display subsystem with a playback buffer;
   a network interface; and
   a processor, said processor running software performing the functions of:
      downloading a single video via the network interface, the single video consisting of a series of video segments, for each video segment:
         predicting throughput for the download of a plurality of the next N video segments;
         calculating a bitrate for the download of the video segment as a function of current buffer occupancy, the bitrate requested for the downloads of one or more prior video segments and the predicted throughput, to maintain a desired quality of experience;
         requesting to download the video segment at the calculated bitrate;
         downloading the video segment at the requested bitrate; and
         storing said downloaded video segment in the playback buffer; and
      removing video segments from the playback buffer and rendering said video segments on said video display.

2. The device of claim 1 wherein said desired quality of experience is expressed as a set of weighted factors based on expressed preferences of a user of said device.

3. The device of claim 2 wherein said weighted factors include average video quality, average quality variations, total rebuffer time or number of rebufferings and start-up delay.

4. The device of claim 1 wherein said predictions of likely throughput for the next N downloads are based on the throughput for the last several downloads.

5. The device of claim 3 wherein said average video quality is expressed by the function $$\frac{1}{K}\sum_{k=1}^{K} q(R_k),$$

wherein K represents the number of video segments in the single video;
wherein $R_k$ represents the bit rate at which video segment k was downloaded; and
wherein $q(R_5)$ represents the video quality perceived by the user for video segment k.

6. The device of claim 5 wherein said average quality variations are expressed by the function $$\frac{1}{K}\sum_{k=1}^{K-1}|q(R_{k+1})-q(R_k)|.$$

7. The device of claim 6 wherein said total rebuffer time is expressed by the function $$\sum_{k=1}^{K}\left(\frac{d_k(R_k)}{C_k}-B_k\right)_+$$

wherein $d_k$ represents the download time for video segment k; and wherein $C_k$ represents the average download speed for video segment k.

8. The device of claim 7 wherein said quality of experience is expressed by the function:

$$QoE_1^K = \sum_{k=1}^{K} q(R_k) - \lambda \sum_{k=1}^{K-1}|q(R_{k+1})-q(R_k)| - \mu \sum_{k=1}^{K}\left(\frac{d_k(R_k)}{C_k}-B_k\right)_+ - \mu_s T_s$$

wherein $\lambda$, $\mu$ and $\mu_s$ are non-negative weighting parameters corresponding to video quality variations and rebuffing time;

wherein $B_k$ represents the buffer occupancy at the start of the download of video segment k; and wherein $T_s$ is the startup delay.

9. The device of claim 1 wherein said function of obtaining said desired bitrate for the next download comprises retrieving said desired bitrate from a table.

10. The device of claim 9 wherein said table is indexed by the values for current buffer occupancy and said predicted throughput.

11. The device of claim 10 wherein said table is further indexed by N.

12. The device of claim 10 wherein values for current buffer occupancy and predicted throughput are binned to reduce the number of entries in said table.

13. A streaming video playback device comprising:
a video display screen;
a video display subsystem with a playback buffer;
a network interface; and
a processor, said processor running software, said software consisting of:
an HTTP module, for requesting successive video segments from a single video from a video server, each segment being requested at a bitrate calculated for that segment; and for storing received video segments in said playback buffer;
a throughput predictor module, for predicting future likely throughput for the download of a plurality of the next N video segments in the series based on throughput realized from preceding downloads of video segments; and
a bitrate controller, for determining the said calculated bitrate at which the next video segment should be requested, based on input from said throughput predictor module and the current occupancy of said playback buffer;
wherein said bit rate controller communicates said calculated bitrate to said HTTP module; and
wherein said bitrate at which the next video segment should be requested is calculated by said bitrate controller as a function of current buffer occupancy, the specific bitrate calculated for the previous downloads and said predicted throughput, to maintain a desired quality of experience.

14. The device of claim 13 wherein said quality of experience of said user is expressed as a set of weighted factors based on expressed preferences of said user.

15. The device of claim 14 wherein said weighted factors include average video quality, average quality variations, total rebuffer time or number of rebufferings and start-up delay.

* * * * *

UNITED STATES PATENT AND TRADEMARK OFFICE
CERTIFICATE OF CORRECTION

PATENT NO. : 10,271,112 B2  
APPLICATION NO. : 15/082444  
DATED : April 23, 2019  
INVENTOR(S) : Yin Xiaoqi et al.

Page 1 of 1

It is certified that error appears in the above-identified patent and that said Letters Patent is hereby corrected as shown below:

On the Title Page

Item (72): Inventors -- Please replace "Yin Xiaoqi" with "Xiaoqi Yin", replace "Sekar Vyas" with "Vyas Sekar" and replace "Sinopoli Bruno" with "Bruno Sinopoli" --

In the Claims

Claim 5, Line 66 -- Please replace "wherein q(R5)" with "wherein q(Rk)" --

Signed and Sealed this  
Thirty-first Day of December, 2019

Andrei Iancu  
*Director of the United States Patent and Trademark Office*